(12) United States Patent
Lai

(10) Patent No.: US 12,275,562 B2
(45) Date of Patent: Apr. 15, 2025

(54) PAPER-PLASTIC MOLDED CUP COVER CAPABLE OF COMPLETELY FASTENING TO CUP BODY

(71) Applicant: Changzhou City Cheng Xin Environmental Protection Technology Co., Ltd., Changzhou (CN)

(72) Inventor: Tzung-Shen Lai, Taipei (TW)

(73) Assignee: Changzhou city cheng xin environmental protection technology Co., Ltd, Jiangsu (CN)

( * ) Notice: Subject to any disclaimer, the term of this patent is extended or adjusted under 35 U.S.C. 154(b) by 8 days.

(21) Appl. No.: 17/924,976

(22) PCT Filed: May 12, 2020

(86) PCT No.: PCT/CN2020/089800
§ 371 (c)(1),
(2) Date: Nov. 11, 2022

(87) PCT Pub. No.: WO2021/226827
PCT Pub. Date: Nov. 18, 2021

(65) Prior Publication Data
US 2023/0192363 A1    Jun. 22, 2023

(51) Int. Cl.
*B65D 43/02* (2006.01)
*B65D 43/06* (2006.01)

(52) U.S. Cl.
CPC ......... *B65D 43/0212* (2013.01); *B65D 43/06* (2013.01); *B65D 2543/00314* (2013.01); *B65D 2543/00351* (2013.01); *B65D 2543/00638* (2013.01)

(58) Field of Classification Search
CPC ........... B65D 2543/00314; B65D 2543/00259; B65D 2543/00268; B65D 2543/00046; B65D 21/023; B65D 43/0212
See application file for complete search history.

(56) References Cited

U.S. PATENT DOCUMENTS

2013/0248481 A1 *  9/2013  Hoekstra ............ B65D 43/0212
                                                           220/795

FOREIGN PATENT DOCUMENTS

| CA | 2573202 | 7/2008 |
| CN | 107869094 | 4/2018 |
| CN | 108945776 | 12/2018 |

(Continued)

OTHER PUBLICATIONS

Machine translation of CN209871161, Dec. 31, 2019.
(Continued)

*Primary Examiner* — Jeffrey R Allen

(57) ABSTRACT

A paper-plastic molded cup cover capable of completely fastening to a cup body, which is an integrally molded cup cover formed by utilizing a paper-plastic molding technique. The inner side of the cup cover is provided with a C-shaped ring accommodating recess, and protruding arc walls respectively project from two ends of the C-shaped ring accommodating recess. By means of the C-shaped ring accommodating recess and the protruding arc walls at the two ends of the C-shaped ring accommodating recess, the upper edge of the cup body may be completely fastened and sealed, and therefore, the effect of complete fastening and sealing is achieved.

6 Claims, 6 Drawing Sheets

(56) References Cited

FOREIGN PATENT DOCUMENTS

| | | |
|---|---|---|
| CN | 209871161 | 12/2019 |
| CN | 210284928 | 4/2020 |
| GB | 2412365 | 9/2005 |
| GB | 2496602 | 5/2013 |
| WO | WO2011152703 | 12/2011 |

OTHER PUBLICATIONS

Machine translation of CN210284928, Apr. 10, 2020.
Machine translation of CN108945776, Dec. 7, 2018.
Machine translation of CN107869094, Apr. 3, 2018.
Machine translation of Abstract of CA2573202, Jul. 8, 2008.

* cited by examiner

PAPER-PLASTIC MOLDED CUP COVER CAPABLE OF COMPLETELY FASTENING TO CUP BODY

FIELD OF THE INVENTION

The present invention relates to a cup cover, and more particularly to a paper-plastic molded cup cover capable of completely fastening to cup body which is capable of being matingly engaged with a cup body.

BACKGROUND OF THE INVENTION

With the rise of environmental awareness and the research and development, paper-plastic products made of cellulose fiber materials or plant fibers and molded by a mold have the advantage of being easy to recycle, remanufacture and reuse, because they are quickly used by general public. All paper-plastic products gradually replace plastic products in life, whether it is bowls, plates, cup covers, straws, packaging materials, shock-absorbing materials and other paper-plastic products will gradually replace plastic products. As the material of paper-plastic products is changed from plastic to paper-plastic, in the process of paper-plastic molding, it is not as well known to the industry as plastic products and can be easily formed into various shapes. Therefore, there are still many products that cannot reach plastic products during or after molding. However, the paper and plastic industry has just started and there is still a lot of improvement and development. As one of the most common consumables in daily life, the requirements for the use of cup covers are very strict. In addition to food-grade materials and hygienic conditions, the cup cover as a container body requires better sealing and greater safety.

Referring to FIGS. 5 and 6, a conventional cup cover 3 is rolled from a cellulose fiber bar to reduce an engagement with a cup body. The cup cover 3 contains a recess, an inward tilted fence or a retaining portion 31 configured to engage with the cup body 4 in different geometry manners, such that a rolled engagement sheet 41 of the cup body 4 cannot be matingly engaged with the cup cover 3, thus causing a removal and a leakage of fluids. In addition, the retaining portion 31 of the cup cover 3 is not reinforced to cause deformation easily after being engaged with the rolled engagement sheet 41 of the cup body 4, thus removing the cup cover 3 from the cup body 4 easily.

The present invention has arisen to mitigate and/or obviate the afore-described disadvantages.

SUMMARY OF THE INVENTION

The primary aspect of the present invention is to provide a paper-plastic molded cup cover which is integrally molded from cellulose fiber materials and is capable of being matingly engaged with the cup body, the C-shaped ring accommodating recess is defined on the peripheral fringe of the cup cover and has two arcuately convex fringes formed on two ends of the C-shaped ring accommodating recess, such that the two arcuately convex fringes matingly engage with the rolled engagement sheet of the upper edge of the cup body, thus engaging the cup cover with the cup body matingly.

Another aspect of the present invention is to provide the paper-plastic molded cup cover which is engaged with the external surface and the internal surface of the upper edge of the cup body so that the protruding arc wall of the first end of the C-shaped ring accommodating recess contacts with the external surface of the upper edge of the cup body, and the protruding arc wall of the second end of the C-shaped ring accommodating recess abuts against the internal surface of the upper edge of the C-shaped ring accommodating recess, thus engaging the cup cover with the external surface and the internal surface of the upper edge of the cup body matingly.

To obtain abovementioned aspects, a paper-plastic molded cup cover provided by the present invention contains: a rolled engagement sheet rolled by an upper edge of a cup body.

The cup cover further contains: an annularly closed face formed on a center thereof, a surrounding rib extending downward from an outer wall of the annularly closed face, a shoulder horizontally extending outward from a distal end of the surrounding rib, a peripheral fringe extending downward from an outer side of a curved edge of the shoulder, a C-shaped ring accommodating recess defined between an inner side of the curved edge of the shoulder and an inner side of the peripheral fringe, and two arcuately convex fringes formed on two ends of the C-shaped ring accommodating recess, thus matingly engaging the cup cover with the cup body.

The cup cover is integrally molded from cellulose fiber materials.

The two arcuately convex fringes are a protruding arc wall and a protruding arc wall, the protruding arc wall is adjacent to a first end of the two ends of the C-shaped ring accommodating recess proximate to the surrounding rib and is located on an inner side of the shoulder, and the protruding arc wall is adjacent to a second end of the two ends of the C-shaped ring accommodating recess and is located on an inner side of the peripheral fringe, such that the C-shaped ring accommodating recess, the protruding arc wall, and the protruding arc wall are engaged with an upper edge of the cup body matingly.

A vertical line V extends from a central point C of the C-shaped ring accommodating recess along a Z-axis direction, and a horizontal line E extends from the central point C of the C-shaped ring accommodating recess along an X-axis direction, wherein a vertex P is located on an outermost peak of the protruding arc wall, a vertex Q is located on an outermost peak of the protruding arc wall, and a connection line L is defined between the vertex P of the protruding arc wall and the central point C of the C-shaped ring accommodating recess, wherein a connection line K is defined between the vertex Q of the protruding arc wall and the central point C of the C-shaped ring accommodating recess, such that the central point C of the C-shaped ring accommodating recess is a datum, an angle θ between the connection line L and the connection line K is less than 180 degrees so that the rolled engagement sheet is matingly engaged in the C-shaped ring accommodating recess.

A central line U extends from a center of the annularly closed face of the cup cover, a horizontal line G extends from a highest outer wall of the protruding arc wall along a X-axis direction, a longitudinal distance between the horizontal line G and the vertex P of the protruding arc wall is a distance A, a longitudinal distance between the horizontal line G and the vertex Q is a distance B, wherein the longitudinal distance A is less than the longitudinal distance B, a lateral distance between the central line U of the arcuately closed face and the vertex P of the protruding arc wall is a distance M, and the lateral distance between the central line U of the arcuately closed face and the vertex Q of the protruding arc wall is a distance N, wherein the lateral distance M is less than the lateral distance N.

When the cup cover contacts with the cup body, the rolled engagement sheet of the cup body is connected with the C-shaped ring accommodating recess of the cup cover, the protruding arc wall is located on the external surface of the rolled engagement sheet of the cup body, and a diameter of the external surface of the rolled engagement sheet of the cup body is decreased so that a first force is exerted to the external surface of the rolled engagement sheet of the cup body; when the protruding arc wall is located on the internal surface of the rolled engagement sheet of the cup body, a second force is exerted to the internal surface of the rolled engagement sheet of the cup body, such that a distance between the protruding arc wall and the protruding arc wall occurs, and the protruding arc wall and the protruding arc wall exert action forces to the internal surface and the external surface of the rolled engagement sheet, hence the cup cover is reinforced by the protruding arc wall and the protruding arc wall to avoid a deformation and to matingly contact with the cup body.

Accordingly, the cup cover is integrally molded from cellulose fiber materials is capable of being matingly engaged with the cup body, for example, the C-shaped ring accommodating recess is defined between the shoulder and the peripheral fringe of the cup cover, the protruding arc wall is adjacent to the first end of the C-shaped ring accommodating recess proximate to the surrounding rib and is located on the inner side of the shoulder, and the protruding arc wall is adjacent to the second end of the C-shaped ring accommodating recess and is located on the inner side of the peripheral fringe, such that the C-shaped ring accommodating recess, the protruding arc wall, and the protruding arc wall are engaged with the upper edge of the cup body matingly.

DETAILED DESCRIPTION OF THE PREFERRED EMBODIMENTS

Figure 1:
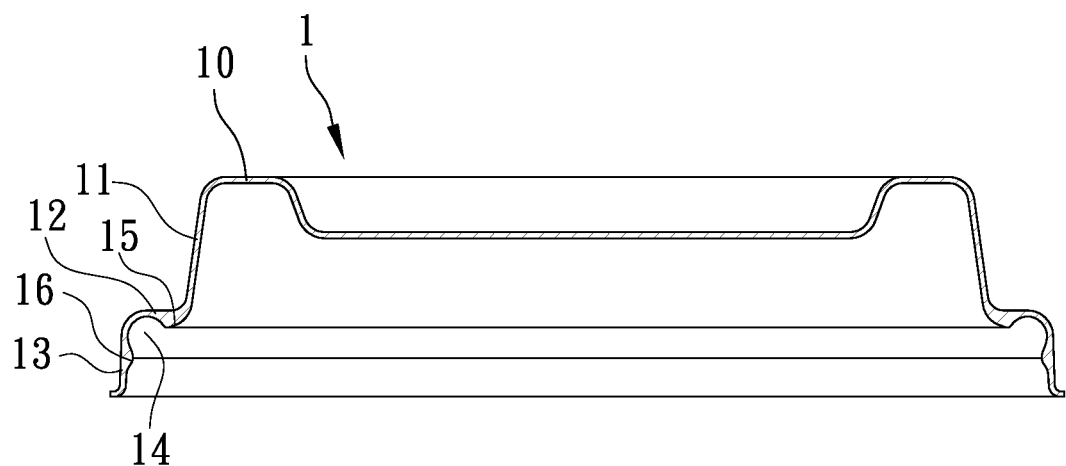
FIG. 1 is a cross sectional view showing the assembly of a paper-plastic molded cup cover according to a preferred embodiment of the present invention.
Figure 2:
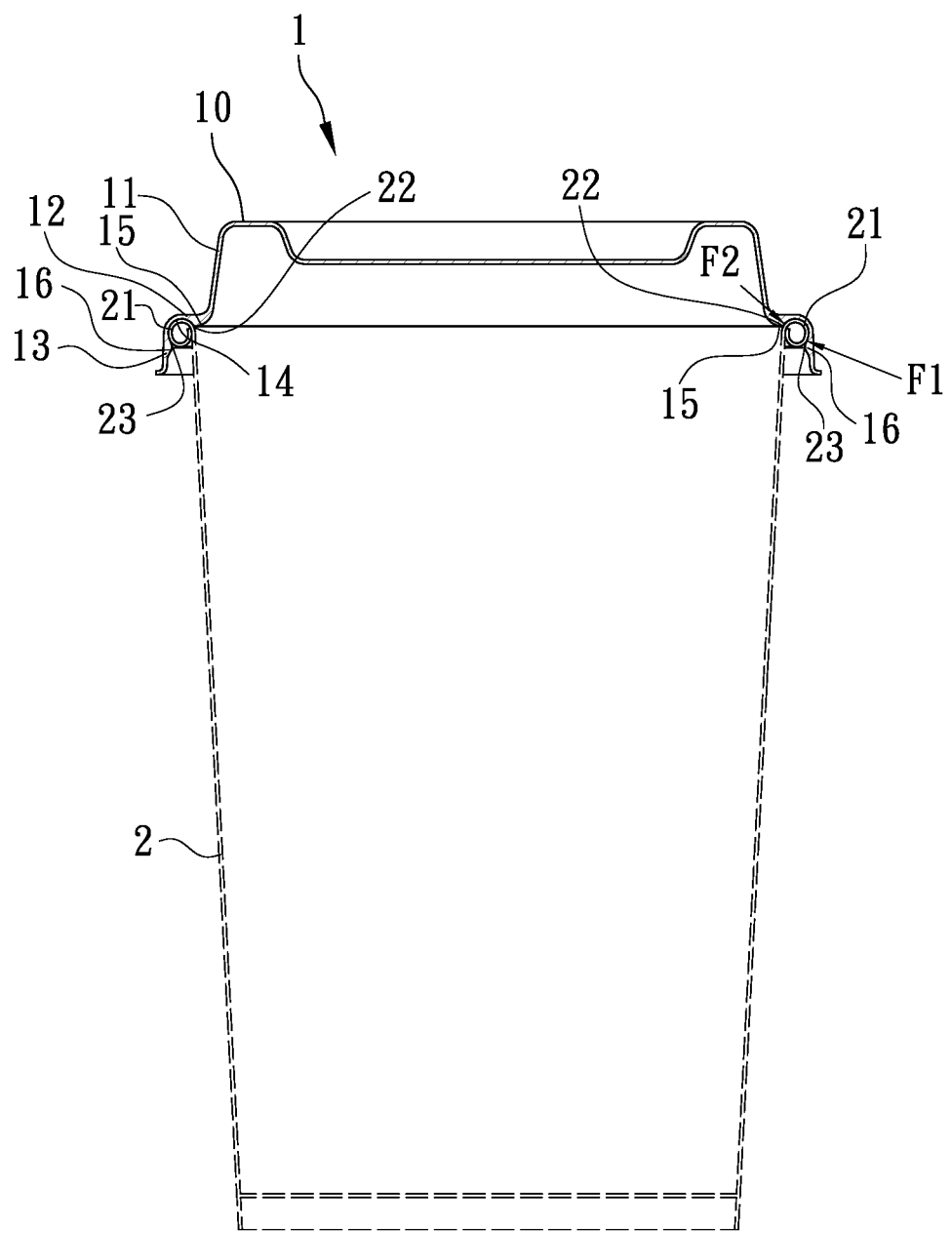
FIG. 2 is a cross sectional view showing the connection of the paper-plastic molded cup cover and a cup body according to the preferred embodiment of the present invention.
Figure 3:
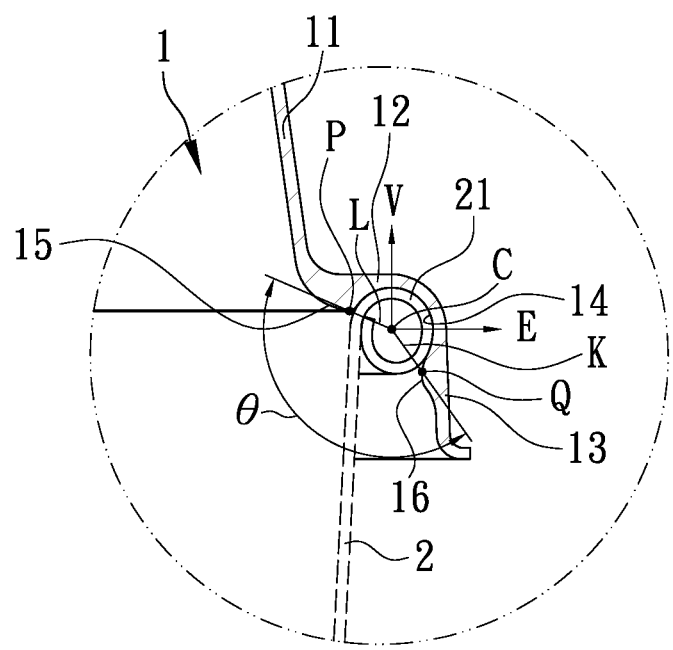
FIG. 3 is an amplified view of a part of FIG. 2.
Figure 3:
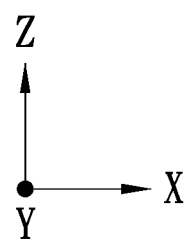

With reference to FIGS. 1-3, a paper-plastic molded cup cover 1 capable of being matingly engaged with a cup body 2 according to a preferred embodiment of the present invention is integrally molded from cellulose fiber materials, and the cup cover 1 comprises an annularly closed face 10 formed on a center of the cup cover 1, a surrounding rib 11 extending downward from an outer wall of the annularly closed face 10, a shoulder 12 horizontally extending outward from a distal end of the surrounding rib 11, a peripheral fringe 13 extending downward from an outer side of a curved edge of the shoulder 12, a C-shaped ring accommodating recess 14 defined between an inner side of the curved edge of the shoulder 12 and an inner side of the peripheral fringe 13, and two arcuately convex fringes formed on two ends of the C-shaped ring accommodating recess 14, wherein the two arcuately convex fringes are a protruding arc wall 15 and a protruding arc wall 16, the protruding arc wall 15 is adjacent to a first end of the two ends of the C-shaped ring accommodating recess 14 proximate to the surrounding rib 11 and is located on an inner side of the shoulder 12, and the protruding arc wall 16 is adjacent to a second end of the two ends of the C-shaped ring accommodating recess 14 and is located on an inner side of the peripheral fringe 13, such that the C-shaped ring accommodating recess 14, the protruding arc wall 15, and the protruding arc wall 16 are engaged with an upper edge of the cup body 2 matingly.

FIG. 3 is a cross sectional view showing the assembly of a part of the paper-plastic molded cup cover and three-dimensional coordinates according to the preferred embodiment of the present invention, wherein a vertical line V extends from a central point C of the C-shaped ring accommodating recess 14 along a Z-axis direction, and a horizontal line E extends from the central point C of the C-shaped ring accommodating recess 14 along a X-axis direction. A vertex P is located on an outermost peak of the protruding arc wall 15, a vertex Q is located on an outermost peak of the protruding arc wall 16, and a connection line L is defined between the vertex P of the protruding arc wall 15 and the central point C of the C-shaped ring accommodating recess 14, wherein a connection line K is defined between the vertex Q of the protruding arc wall 16 and the central point C of the C-shaped ring accommodating recess 14, such that the central point C of the C-shaped ring accommodating recess 14 is a datum, an angle θ between the connection line L and the connection line K is less than 180 degrees so that a rolled engagement sheet 21 is matingly engaged in the C-shaped ring accommodating recess 14, thus engaging the cup cover with the cup tightly.

Figure 4:
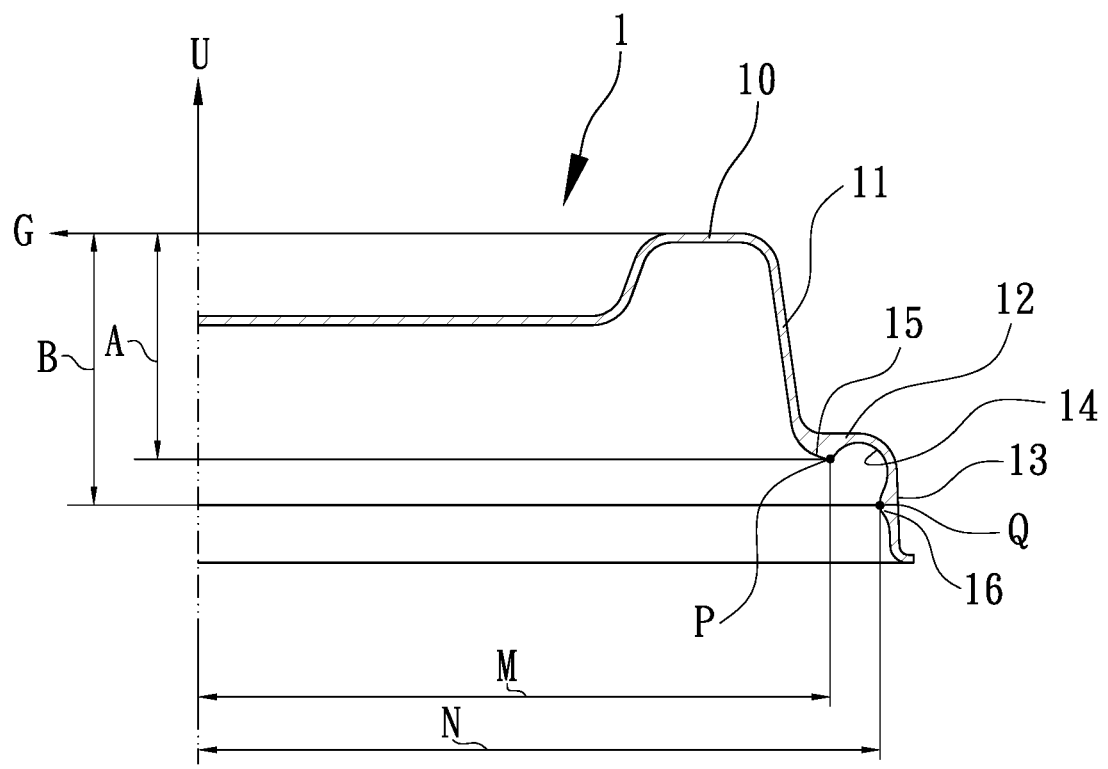
FIG. 4 is an amplified view of a half of FIG. 1.
Figure 4:
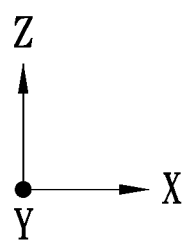
Figure 5:
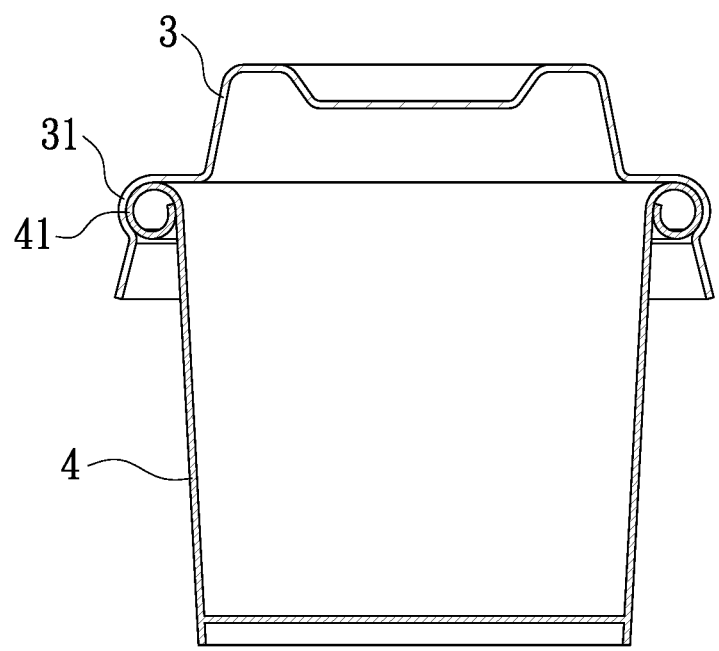
FIG. 5 is a cross section view of a conventional cup cover.
Figure 6:
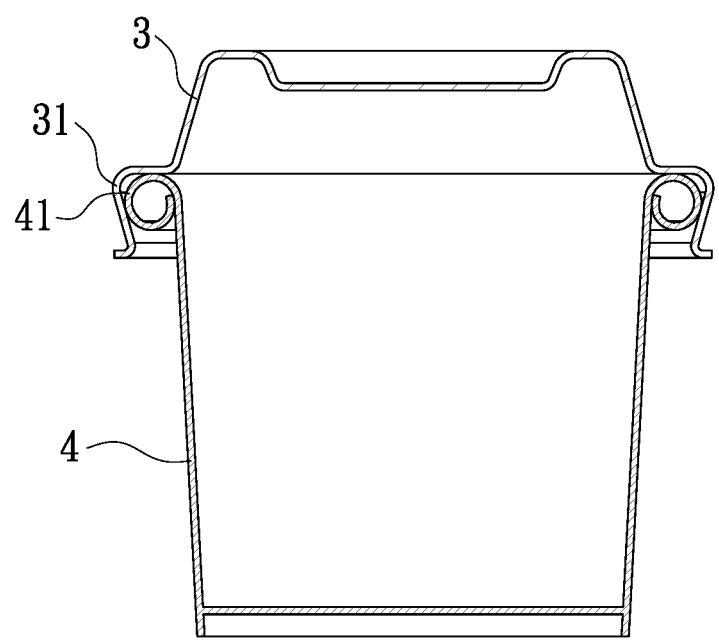
FIG. 6 is another cross section view of the conventional cup cover.

FIG. 4 is a cross sectional view showing the assembly of a part of the paper-plastic molded cup cover and three-dimensional coordinates according to the preferred embodiment of the present invention, wherein a central line U extends from a center of the annularly closed face 10 of the cup cover 1, a horizontal line G extends from a highest outer wall of the protruding arc wall 15 along a X-axis direction, a longitudinal distance between the horizontal line G and the vertex P of the protruding arc wall 15 is a distance A, a longitudinal distance between the horizontal line G and the vertex Q is a distance B, wherein the longitudinal distance A is less than the longitudinal distance B. A lateral distance between the central line U of the arcuately closed face 10 and the vertex P of the protruding arc wall 15 is a distance M, and the lateral distance between the central line U of the arcuately closed face 10 and the vertex Q of the protruding arc wall 16 is a distance N, wherein the lateral distance M is less than the lateral distance N.

The cup cover 1 is fitted downward to the cup body 2 so that the peripheral fringe 13 and the protruding arc wall 16 contact with the upper edge of the cup body 2 and are fitted to the cup body 2, as shown in FIGS. 2 and 3, the rolled engagement sheet 21 is rolled by the upper edge of the cup body 2 and is forced by the protruding arc wall 16 to deform, wherein the rolled engagement sheet 21 of the cup body 2 is received in and matingly contacts with the C-shaped ring accommodating recess 14 along the protruding arc wall 16, the protruding arc wall 15 of the cup cover 1 abuts against an internal surface 22 of the rolled engagement sheet 21 of the cup body 2, and the protruding arc wall 16 of the cup cover 1 contacts with an external surface 23 of the rolled engagement sheet 21 of the cup body 2. Also referring to FIGS. 2-4, after the rolled engagement sheet 21 of the cup body 2 is connected with the C-shaped ring accommodating recess 14 of the cup cover 1, the protruding arc wall 16 is located on the external surface 23 of the rolled engagement sheet 21 of the cup body 2, and a diameter of the external surface 23 of the rolled engagement sheet 21 of the cup body 2 is decreased so that a first force F1 is exerted to the external surface 23 of the rolled engagement sheet 21 of the cup body 2. When the protruding arc wall 15 is located on the internal surface 22 of the rolled engagement sheet 21 of the cup body 2, a second force F2 is exerted to the internal surface 22 of the rolled engagement sheet 21 of the cup body 2, such that a distance between the protruding arc wall 15 and the protruding arc wall 16 occurs, and the protruding arc wall 15 and the protruding arc wall 16 exert forces to the internal surface 22 and the external surface 23 of the rolled engagement sheet 21, hence the cup cover 1 is reinforced by the protruding arc wall 15 and the protruding arc wall 16 to avoid a deformation and to matingly contact with the cup.

Accordingly, the cup cover 1 is integrally molded from the cellulose fiber materials and is capable of being matingly engaged with the cup body 2, wherein the C-shaped ring accommodating recess 14 is defined between the shoulder 12 and the peripheral fringe 13 of the cup cover 1, the protruding arc wall 15 is adjacent to the first end of the C-shaped ring accommodating recess 14 proximate to the surrounding rib 11 and is located on the inner side of the shoulder 12, and the protruding arc wall 16 is adjacent to the second end of the C-shaped ring accommodating recess 14 and is located on the inner side of the peripheral fringe 13, such that the C-shaped ring accommodating recess 14, the protruding arc wall 15, and the protruding arc wall 16 are engaged with the upper edge of the cup body 2 matingly.

While the preferred embodiments of the invention have been set forth for the purpose of disclosure, modifications of the disclosed embodiments of the invention and other embodiments thereof may occur to those skilled in the art. Accordingly, the appended claims are intended to cover all embodiments which do not depart from the spirit and scope of the invention.

What is claimed is:

1. A paper-plastic molded cup cover and a related cup body, the cup body comprising a rolled engagement sheet on an upper edge of the cup body, the rolled engagement sheet having a circular cross-section; wherein the paper-plastic molded cup cover comprises:
   an annularly closed face formed on a center thereof,
   a surrounding rib extending downward from an outer wall of the annularly closed face,
   a shoulder horizontally extending outward from a distal end of the surrounding rib,
   a peripheral fringe extending downward from an outer side of a curved edge of the shoulder,
   wherein a C-shaped ring accommodating recess is defined between an inner side of the curved edge of the shoulder and an inner side of the peripheral fringe, and two arcuately convex fringes are formed on two ends of the C-shaped ring accommodating recess, for engaging the rolled engagement sheet of the cup cover with the cup body, an entire inner surface of the C-shaped ring accommodating surface contacting the rolled engagement sheet, the inner surface extending from one of the two arcuately convex fringes to the other of the two arcuately convex fringes.

2. The paper-plastic molded cup cover as claimed in claim 1, wherein the cup cover is integrally molded from cellulose fiber materials.

3. The paper-plastic molded cup cover as claimed in claim 1, wherein the two arcuately convex fringes are a first protruding arc wall and a second protruding arc wall, the first protruding arc wall is adjacent to a first end of the two ends of the C-shaped ring accommodating recess proximate to the surrounding rib and is located on an inner side of the shoulder, and the second protruding arc wall is adjacent to a second end of the two ends of the C-shaped ring accommodating recess and is located on an inner side of the peripheral fringe, such that the C-shaped ring accommodating recess, the first protruding arc wall, and the second protruding arc wall are engaged with the upper edge of the cup body.

4. The paper-plastic molded cup cover as claimed in claim 3, wherein for a vertical line V extending from a central point C of the C-shaped ring accommodating recess along a Z-axis direction, and for a horizontal line E extending from the central point C of the C-shaped ring accommodating recess along an X-axis direction, and wherein for a vertex P that is located on an outermost peak of the first protruding arc wall, for a vertex Q that is located on an outermost peak of the second protruding arc wall, and for a connection line L that is defined between the vertex P of the first protruding arc wall and the central point C of the C-shaped ring accommodating recess, and for a connection line K that is defined between the vertex Q of the second protruding arc wall and the central point C of the C-shaped ring accommodating recess, an angle θ between the connection line L and the connection line K is less than 180 degrees.

5. The paper-plastic molded cup cover as claimed in claim 4, wherein for a central line U extending from a center of the annularly closed face of the cup cover, and for a horizontal line G extends from a highest outer wall of the annularly closed face along a X-axis direction, a longitudinal distance between the horizontal line G and the vertex P of the first protruding arc wall being a distance A, a longitudinal distance between the horizontal line G and the vertex Q being a distance B, the longitudinal distance A is less than the longitudinal distance B, and wherein a lateral distance between the central line U of the arcuately closed face and the vertex P of the protruding arc wall is a distance M, and the lateral distance between the central line U of the arcuately closed face and the vertex Q of the protruding arc wall is a distance N, the lateral distance M is less than the lateral distance N.

6. The paper-plastic molded cup cover as claimed in claim 5, wherein the rolled engagement sheet of the cup body is connected with the C-shaped ring accommodating recess of the cup cover, the second protruding arc wall located on an external surface of the rolled engagement sheet of the cup body, so that a first force is exerted to the external surface of the rolled engagement sheet of the cup body; and when the first protruding arc wall is located on an internal surface of the rolled engagement sheet of the cup body, a second force is exerted to the internal surface of the rolled engagement sheet of the cup body, such that the first protruding arc wall and the second protruding arc wall exert action forces to the internal surface and the external surface of the rolled engagement sheet.

* * * * *